(12) United States Patent
Wakefield

(10) Patent No.: US 7,169,196 B2
(45) Date of Patent: Jan. 30, 2007

(54) FUEL OR FUEL ADDITIVE CONTAINING DOPED CERIUM OXIDE NANOPARTICLES

(75) Inventor: Gareth Wakefield, Oxford (GB)

(73) Assignee: Oxonica Materials Limited, Kidlington (GB)

( * ) Notice: Subject to any disclaimer, the term of this patent is extended or adjusted under 35 U.S.C. 154(b) by 0 days.

(21) Appl. No.: 10/494,815

(22) PCT Filed: Nov. 6, 2002

(86) PCT No.: PCT/GB02/05013

§ 371 (c)(1),
(2), (4) Date: Oct. 20, 2004

(87) PCT Pub. No.: WO03/040270

PCT Pub. Date: May 15, 2003

(65) Prior Publication Data

US 2005/0066571 A1    Mar. 31, 2005

(30) Foreign Application Priority Data

Nov. 6, 2001  (GB) ................................. 0126663.4

(51) Int. Cl.
*C10L 1/12*   (2006.01)
*C10L 1/188*  (2006.01)
*B01J 23/10*  (2006.01)

(52) U.S. Cl. ............................ 44/354; 44/357; 44/436; 44/437; 44/438; 44/451; 44/452; 502/100; 502/101; 502/304; 502/344; 502/345

(58) Field of Classification Search ................... 44/354
See application file for complete search history.

(56) References Cited

U.S. PATENT DOCUMENTS

| 2,433,932 | A | * | 1/1948 | Stosick ....................... 60/218 |
| 3,048,007 | A | * | 8/1962 | Ewing et al. ................. 60/218 |
| 4,940,685 | A |   | 7/1990 | Sauvion et al. |
| 5,732,548 | A | * | 3/1998 | Peter-Hoblyn ................ 60/274 |
| 5,976,476 | A | * | 11/1999 | Blanchard et al. ........ 423/213.2 |
| 6,039,772 | A | * | 3/2000 | Orr .............................. 44/359 |
| 6,093,223 | A | * | 7/2000 | Lemaire et al. ................. 44/354 |
| 6,180,558 | B1 |  | 1/2001 | Kurokawa et al. |
| 6,187,824 | B1 |  | 2/2001 | Swank |
| 6,204,219 | B1 |  | 3/2001 | Brezny et al. |

FOREIGN PATENT DOCUMENTS

| EP | 0 460 730 A1 | 11/1991 |
| GB | 1 452 783 A | 10/1976 |
| GB | 2 102 780 A | 2/1983 |
| WO | WO 95/18198 A | 7/1995 |
| WO | WO 97/04045 A | 2/1997 |
| WO | WO 97/19022 A | 5/1997 |
| WO | WO 98/04655 A | 2/1998 |
| WO | WO 99/13026 A | 3/1999 |
| WO | WO 99/59754 A | 11/1999 |
| WO | WO 01/10545 A1 | 2/2001 |
| WO | WO 02/00812 A2 | 1/2002 |

OTHER PUBLICATIONS

Martinez-Arias, et al., "Comparative Study on Redox Properties and Catalytic Behavior for . . . ", Journal of Catalysis 195, 207-216 (2000).

Harrison, et al., "Nature and Surface Redox Properties of Copper(II)-Promoted C erium (IV) Oxide CO-Oxidation Catalysts," Chem. Mater. 2000, 12, 3715-3725.

* cited by examiner

*Primary Examiner*—Joseph D. Anthony
(74) *Attorney, Agent, or Firm*—Wolf, Greenfield & Sacks, P.C.

(57) ABSTRACT

A fuel or fuel additives is disclosed which includes particles of cerium oxide which have been doped with a divalent or trivalent metal or metalloid which is a rare earth metal, a transition metal or a metal of group IIA, IIIB, VB, or VIB of the Periodic Table.

19 Claims, No Drawings

FUEL OR FUEL ADDITIVE CONTAINING DOPED CERIUM OXIDE NANOPARTICLES

RELATED APPLICATIONS

This application is a national stage filing under 35 U.S.C. § 371 of PCT International application PCT/GB02/05013, filed Nov. 6, 2002, which was published under PCT Article 21(2) in English.

This invention relates to cerium oxide nanoparticles which are useful as catalysts.

Cerium oxide is widely used as a catalyst in three way converters for the elimination of toxic exhaust emission gases in automobiles. The ceria contained within the catalyst can act as a chemically active component, working as an oxygen store by release of oxygen in the presence of reductive gases, and removal of oxygen by interaction with oxidising species.

Cerium oxide may store and release oxygen by the following processes:

The key to the use of ceria for catalytic purposes is the low redox potential between the $Ce^{3+}$ and $Ce^{4+}$ ions (1.7V) that allows the above reaction to easily occur in exhaust gases. Cerium oxide may provide oxygen for the oxidation of CO or $C_nH_n$ or may absorb oxygen for the reduction of $NO_x$. The amounts of oxygen reversibly provided in and removed from the gas phase are called the oxygen storage capacity (OSC) of ceria.

The above catalytic activity may occur when cerium oxide is added as an additive to fuel, for example diesel or petrol. However, in order for this effect to be useful the cerium oxide must be of a particle size small enough to remain in a stable dispersion in the fuel. The cerium oxide particles must be of a nanocrystalline nature, for example they should be less than 1 micron in size, and preferentially 1–300 nm in size. In addition, as catalytic effects are surface area dependant the small particle size renders the nanocrystalline material more effective as a catalyst.

It has now been found, according to the present invention, that the catalytic efficiency of cerium oxide can be enhanced by addition of further components in the material. In particular it has been found that cerium oxide may be doped with components that result in additional oxygen vacancies being formed. Thus doping will generally be substitution doping as opposed to interstitial doping. This will clearly enhance the OSC of the material, and hence its catalytic properties. Such dopant ions must be di- or tri-valent in order to provide oxygen vacancies. They must also be of a size that allows incorporation of the ion within the surface region of the cerium oxide nanoparticles. Accordingly metals with a large ionic radius should not be used. For example transition metals in the first and second row of transition metals are generally preferred over those listed in the third. The ceria serves as the oxygen activation and exchange medium during a redox reaction. However, because ceria and the like are ceramic materials, they have low electronic conductivity and low activity surface sites for the chemisorption of the reacting species. Transition metal additives are particularly useful to improve this situation. In addition, multivalent dopants will also have a catalytic effect of their own.

It is believed that doping in this way changes the zeta potential and thus improves the dispersion.

According to the present invention there is provided a fuel additive which comprises a particle of cerium oxide which has been doped with a divalent or trivalent metal or metalloid which is a rare earth metal, a transition metal, including a noble metal, or a metal of Group IIA, IIIB, VB, or VIB of the Periodic Table and a polar or non-polar organic solvent as well as a fuel containing such an additive or such particles. Typically the oxides will have the formula $Ce_{1-x}M_xO_2$ where M is a said metal or metalloid, in particular Rh, Cu, Ag, Au, Pd, Pt, Sb, Se, Fe, Ga, Mg, Mn, Cr, Be, B, Co, V and Ca as well as Pr, Sm and Gd and x has a value up to 0.3, typically 0.01 or 0.1 to 0.2, or of the formula $[(CeO_2)_{1-n}(REO_y)_n]_{1-k}M'_k$ where $M'_k$ is a said metal or metalloid other than a rare earth, RE is a rare earth y is 1 or 1.5 and each of n and k, which may be the same or different, has a value up to 0.5, preferably up to 0.3, typically 0.01 or 0.1 to 0.2. Copper is particularly preferred. If too much dopant is used, there will be an increasing tendency for it to form an oxyanion thus negating the benefits of introducing it.

In general the particles will have a size not exceeding 1 micron and especially not exceeding 300 nm, for example 1 to 300 nm, such as between 5 and 150 nm, in particular 10 to 50 nm, especially 10 to 20 nm.

Dopants may be incorporated into the cerium oxide nanoparticles principally by one of the following:

i) Doping within the particle during formation, e.g. by co-precipitation.

ii) Absorption of dopant ions onto the surface followed by firing of the dopant ion into the material. Note that particle size of the cerium oxide does not increase during firing.

(iii) A combustion synthesis. Doping during formation can be achieved by a combustion process whereby a mixture of salts of cerium and the dopant metal is heated together with, for example, glycine or other combustible solvent, preferably oxygen-containing, such as aliphatic alcohols, for example $C_{1-C6}$ alcohols, in particular isopropyl alcohol, in a flame to convert it to the oxide.

(iv) A mechano-chemical process typically involving milling, generally using a ball mill such as that described in WO99/59754 which involves subjecting a cerium oxide precursor and a dopant precursor in a non-reactive diluent to mechanical milling, heat treating the resulting material to convert it into the oxide and removing the diluent. The precursors are typically hydroxides, carbonates, sulphates or oxychlorides, especially cerium hydroxide and cerium carbonate. A typical diluent is sodium chloride which can readily be removed with water.

(v) A double decomposition process whereby, for example a salt of cerium and of the dopant, such as nitrate or chloride is reacted with a soluble oxide or hydroxide, for example of magnesium or calcium and the resulting oxide or hydroxide is recovered and the water soluble removed, typically by washing. In the case of the hydroxide, this is fired to convert it to the desired doped oxide.

Although it is clear that techniques other than (ii) will result in a dopant distribution that is even within the particle and the second may result in a predominately surface doping this is of little importance since the reaction involves surface based catalysis. The relative concentrations of dopant for optimum performance will vary however.

Of particular importance is the doping of copper into the cerium oxide nanoparticles. The redox properties of the copper-cerium system have been recognised as being synergistic, with the combination being more readily reduced than the corresponding independent compounds.

Doping during formation typically involves mixing, in an aqueous solution, a water-soluble cerium salt and a water-soluble salt of the dopant and raising the pH of the solution to cause the desired doped cerium oxide to precipitate.

Suitable salts include nitrates and carbonates. The pH can be raised by the addition of an alkali such as ammonium hydroxide. A final pH exceeding 8, typically 8 to 10, is generally needed.

As indicated, the dopant can also be inserted by firing. The dopant ion can be incorporated into the host lattice of cerium oxide by a baking technique typically at from 600° C. to 1000° C. For this purpose cerium oxide and a salt of the metal dopant can be mixed in water and, if desired, ultrasonicated for, say, 10 minutes and boiled dry. The material is then fired, typically for several hours, for example 3 hours, to give the doped material.

It will be appreciated that although reference is made to doping with a specific metal or metalloid, the metal or metalloid can be introduced as an oxide or, initially, a salt which is converted into an oxide during the process.

It will also be appreciated that, if desired, more than one dopant can be used. Likewise the cerium oxide can be in the form of a mixed oxide i.e. another tetravalent metal can be incorporated such as zirconium (or doped with both a rare earth and another metal or metalloid M').

The amount of dopant incorporated can, of course, be adjusted by controlling the amount of doping salt employed, as one skilled in the art will appreciate.

It is preferred that the particles are coated to prevent agglomeration. For this purpose the particles can be comminuted in an organic solvent in the presence of a coating agent which is an organic acid, anhydride or ester or a Lewis base. It has been found that, in this way which involves coating in situ, it is possible to significantly improve the coating of the oxide. Further, the resulting product can, in many instances, be used directly without any intermediate step. Thus in some coating procedures it is necessary to dry the coated particles before dispersing them in a hydrocarbon solvent.

Thus the cerium oxide can be dispersible or soluble in the (liquid) fuel or another hydrocarbon or other solvent compatible with the fuel.

The particles which are subjected to the process should have as large a surface area as possible and preferably the particles have a surface area, before coating, of at least 10 m²/g and preferably a surface area of at least 50 or 75 m²/g, for example 80–150 m²/g, or 100–300 m²/g.

The coating agent is suitably an organic acid, anhydride or ester or a Lewis base. The coating agent is preferably an organic carboxylic acid or an anhydride, typically one possessing at least 8 carbon atoms, for example 10 to 25 carbon atoms, especially 12 to 18 carbon atoms such as stearic acid. It will be appreciated that the carbon chain can be saturated or unsaturated, for example ethylenically unsaturated as in oleic acid. Similar comments apply to the anhydrides which can be used. A preferred anhydride is dodecylsuccinic anhydride. Other organic acids, anhydrides and esters which can be used in the process of the present invention include those derived from phosphoric acid and sulphonic acid. The esters are typically aliphatic esters, for example alkyl esters where both the acid and ester parts have 4 to 18 carbon atoms.

Other coating or capping agents which can be used include Lewis bases which possess an aliphatic chain of at least 8 carbon atoms including mercapto compounds, phosphines, phosphine oxides and amines as well as long chain ethers, diols, esters and aldehydes. Polymeric materials including dendrimers can also be used provided that they possess a hydrophobic chain of at least 8 carbon atoms and one or more Lewis base groups, as well as mixtures of two or more such acids and/or Lewis bases.

Typical polar Lewis bases include trialkylphosphine oxides $P(R^3)_3O$, especially trioctylphosphine oxide (TOPO), trialkylphosphines, $P(R^3)_3$, amines $N(R^3)_2$, thiocompounds $S(R^3)_2$ and carboxylic acids or esters $R^3COOR^4$ and mixtures thereof, wherein each $R^3$, which may be identical or different, is selected from $C_{1-24}$ alkyl groups, $C_{2-24}$ alkenyl groups, alkoxy groups of formula —$O(C_{1-24}$ alkyl), aryl groups and heterocyclic groups, with the proviso that at least one group $R^3$ in each molecule is other than hydrogen; and wherein $R^4$ is selected from hydrogen and $C_{1-24}$ alkyl groups, preferably hydrogen and $C_{1-14}$ alkyl groups. Typical examples of $C_{1-24}$ and $C_{1-4}$ alkyl groups, $C_{2-24}$ alkenyl groups, aryl groups and heterocyclic groups are described below.

It is also possible to use as the polar Lewis base a polymer, including dendrimers, containing an electron rich group such as a polymer containing one or more of the moieties $P(R^3)_3O$, $P(R^3)_3$, $N(R^3)_2$, $S(R^3)_2$ or $R^3COOR^4$ wherein $R^3$ and $R^4$ are as defined above; or a mixture of Lewis bases such as a mixture of two or more of the compounds or polymers mentioned above.

As used herein, a $C_{1-4}$ alkyl group is an alkyl group as defined above which contains from 1 to 4 carbon atoms. $C_{1-4}$ alkyl groups include methyl, ethyl, i-propyl, n-propyl, n-butyl and tert-butyl.

As used herein, a $C_{2-24}$ alkenyl group is a linear or branched alkenyl group which may be unsubstituted or substituted at any position and which may contain heteroatoms selected from P, N, O and S. Typically, it is unsubstituted or carries one or two substituents. Suitable substituents include halogen, hydroxyl, cyano, —$NR_2$, nitro, oxo, —$CO_2R$, —SOR and —$SO_2R$ wherein each R may be identical or different and is selected from hydrogen or $C_{1-4}$ alkyl.

As used herein, a $C_{2-4}$ alkenyl group is an alkenyl group as defined above which contains from 2 to 4 carbon atoms. $C_{2-4}$ alkenyl groups include ethenyl, propenyl and butenyl.

As used herein, an aryl group is typically a $C_{6-10}$ aryl group such as phenyl or naphthyl, preferably phenyl. An aryl group may be unsubstituted or substituted at any position, with one or more substituent. Typically, it is unsubstituted or carries one or two substituent. Suitable substituent include $C_{1-4}$ alkyl, $C_{1-4}$ alkenyl, each of which may be substituted by one or more halogens, halogen, hydroxyl, cyano, —$NR_2$, nitro, oxo, —$CO_2R$, —SOR and —$SO_2R$ wherein each R may be identical or different and is selected from hydrogen and $C_{1-4}$ alkyl.

As used herein, a heterocyclic group is a 5- to 10-membered ring containing one or more heteroatoms selected from N, O and S. Typical examples include pyridyl, pyrazinyl, pyrimidinyl, pyridazinyl, furanyl, thienyl, pyrazolidinyl, pyrrolyl and pyrazolyl groups. A heterocyclic group may be substituted or unsubstituted at any position, with one or more substituent. Typically, a heterocyclic group is unsubstituted or substituted by one or two substituents. Suitable substituents include $C_{1-4}$ alkyl, $C_{1-4}$ alkenyl, each of which may be substituted by one or more halogens, halogen, hydroxyl, cyano, —$NR_2$, nitro, oxo, —$CO_2R$, —SOR and —$SO_2R$ wherein each R may be identical or different and is selected from hydrogen and $C_{1-4}$ alkyl.

As used herein, halogen is fluorine, chlorine, bromine or iodine, preferably fluorine, chlorine or bromine.

The coating process can be carried out in an organic solvent. Preferably, the solvent is non-polar and is also preferably non-hydrophilic. It can be an aliphatic or an aromatic solvent. Typical examples include toluene, xylene, petrol, diesel fuel as well as heavier fuel oils. Naturally, the organic solvent used should be selected so that it is compatible with the intended end use of the coated particles. The presence of water should be avoided; the use of an anhydride as coating agent helps to eliminate any water present.

The coating process involves comminuting the particles so as to prevent any agglomerates from forming. The technique employed should be chosen so that the particles are adequately wetted by the agent and a degree of pressure or shear is desirable. Techniques which can be used for this purpose include high-speed stirring (e.g. at least 500 rpm) or tumbling, the use of a colloid mill, ultrasonics or ball milling. Ball milling is preferred. Typically, ball milling can be carried out in a pot where the larger the pot the larger the balls. By way of example, ceramic balls of 7 to 10 mm diameter are suitable when the milling takes place in a 1.25 liter pot. The time required will of course, be dependent on the nature of the particles but, generally, at least 4 hours is required. Good results can generally be obtained after 24 hours so that the typical time is 12 to 36 hours.

The effectiveness of the process can be assessed by studying the stability of the resulting suspension. A turbidity procedure can be used to assess the extent to which the particles remain suspended and therefore un-agglomerated. The agglomerated particles will, of course fall out of suspension and therefore reduce the turbidity of the suspension. By way of example, it has been found that the addition of a suspension of cerium oxide particles obtained by the process is sufficient to act as a fuel catalyst when present in a concentration of about 4 ppm. This compares with a concentration of in excess of 40 ppm for an existing coated cerium oxide product.

The incorporation of the cerium oxide in fuel serves more than one purpose. The primary purpose is to act as a catalyst in the reduction of toxic exhaust gases on combustion of the fuel. However, it can serve another purpose in diesel engines. Diesel engines increasingly comprise a trap for particulates resulting from combustion of the diesel fuel. The presence of the cerium oxide in the traps helps to burn off the particulates which accumulate in the trap. Additionally organo platinum group metal compounds can be present as co-catalysts. Thus the fuels of the present invention can also comprise such a platinum group metal compound. These should be soluble in the fuel and include compounds of platinum or, for example, palladium and rhodium and mixtures of two or more thereof.

Suitable compounds include platinum acetylacetonate and compounds having the formula: $X\ Pt\ R_1\ R_2$ where X is a ligand containing at least one unsaturated carbon-carbon double bond which can be olefinic, acetylenic or aromatic and $R_1$ and $R_2$ are, independently, benzyl, phenyl, nitrobenzyl or alkyl of 1 to 10 carbon atoms such as diphenyl cyclooctadiene platinum (II). The use of the doped ceria enables one to use less of the organo platinum group metal than if undoped ceria is used and this represents an economic advantage.

If desired the resulting particles can be dried and re-dispersed in another organic solvent or in a polymer. Examples of suitable polymers include homo- and co-polymers of ethylene, propylene or styrene, and hydrocarbon-based elastomers such as those containing propylene, butadiene or isoprene.

The particles can be incorporated into the fuel directly or as an additive for the fuel. The particles are preferably incorporated into diesel fuel.

Typical additives which can be used in the fuel compositions, especially diesel fuel, include those conventionally used, such as:

Non polar organic solvents such as aromatic and aliphatic hydrocarbons such as toluene, xylene and white spirit, e.g. those sold under the Trade Mark "SHELLSOL" by the Royal Dutch/Shell Group, Polar organic solvents, in particular, alcohols generally aliphatic alcohols e.g. 2 ethylhexanol, decanol and isotridecanol, Detergents such as hydrocarbyl-substituted amines and amides, e.g. hydro carbyl-substituted succinimides, e.g. a polyisobutenyl succinimide, Dehazers, e.g. alkoxylated phenol formaldehyde polymers such as those commercially available as "NALCO" (Trade Mark) 7D07 (ex Nalco), and "TOLAD" (Trade Mark) 2683 (ex Petrolite), Anti-foaming agents e.g. the polyether-modified polysiloxanes commercially available as "TEGOPREN" (Trade Mark) 5851 (ex Th. Goldschmidt) Q 25907 (ex Dow Corning) or "RHODORSIL" (Trade Mark) (ex Rhone Poulenc))

Ignition improvers such as aliphatic nitrates e.g. 2-ethylhexyl nitrate and cyclohexyl nitrate, Anti-rust agents such as polyhydric alcohol esters of succinic acid derivatives (e.g. commercially sold by Rhein Chemie, Mannheim, Germany as "RC 4801", or by Ethyl corporation as HiTEC 536), Reodorants, Anti-oxidants e.g. phenolics such as 2,6-di-tert-butylphenol, or phenylenediamines such as N,N'-di-sec-butyl-p-phenylenediamine, Metal deactivators such as salicylic acid derivatives, e.g. $N,N^1$-disalicylidene-1,2-propane diamine and, Lubricity agents such as fatty acids and esters, (e.g. those commercially available as EC831, P631, P633 or P639 (ex Infinium) or "HITEC" (Trade Mark) 580 (ex Ethyl Corporation), "Lubrizol" (trade mark) 539A (ex Lubrizol), "VECTRON" (trade mark) 6010 (ex Shell Additives), OLI9000 (ex Associated Octel), Unless otherwise stated, the (active matter) concentration of each additive in the fuel is generally up to 1000 ppmw (parts per million by weight of the diesel fuel), in particular up to 800 ppmw, e.g. 1 to 1000, 1 to 800 or 1–20, ppmw.

The (active matter) concentration of the dehazer in the diesel fuel is preferably in the range from 1 to 20 ppmw. The (active matter) concentrations of other additives (with the exception of the detergent, ignition improver and the lubricity agent) are each preferably up to 20 ppmw. The (active matter) concentration of the detergent is typically up to 800 ppmw e.g. 10 to 500 ppmw. The (active matter) concentration of the ignition improver in the diesel fuel is preferably up to 600 ppmw e.g. 100 to 250 ppmw. If a lubricity agent is incorporated into the diesel fuel, it is conveniently used in an amount of 100 to 500 ppmw.

Some of these additives are more commonly added directly at the refinery while the others form part of a diesel fuel additive (DFA), typically added at the point of loading with the tanker. A typical DFA comprises:

| | |
|---|---|
| detergent | 10–70% (by weight) |
| antirust | 0–10% |
| antifoam | 0–10% |
| dehazer | 0–10% |
| non-polar solvent | 0–50% |
| polar solvent | 0–40% |

The diesel oil itself may be an additised (additive-containing) oil. If the diesel oil is an additised oil, it will contain minor amounts of one or more additives, e.g. anti-static agents, pipeline drag reducers, flow improvers, e.g. ethylene/vinyl acetate copolymers or acrylate/maleic anhydride copolymers, and wax anti-settling agents, e.g. those commercially available under the Trade Marks "PARAFLOW" (e.g. "PARAFLOW" 450; ex Paramins), "OCTEL" (e.g. "OCTEL" W 5000; ex Octel) and "DODIFLOW" (e.g. "DODIFLOW" V 3958; ex Hoechst).

The same or similar additives can be used for other fuels such as petrol, as one skilled in the art will appreciate.

The present invention also provides a method of improving the combustion of a fuel which comprises incorporating therein the cerium oxide particles.

The invention claimed is:

1. A fuel which comprises one or more particles of cerium oxide which have been doped with a divalent or trivalent metal or metalloid which is a rare earth metal, a transition metal or a metal of group IIA, IIIB, VB, or VIB of the Periodic Table.

2. A fuel additive which comprises one or more particles of cerium oxide which have been doped with a divalent or trivalent metal or metalloid which is a rare earth metal, a transition metal or a metal of group IIA, IIIB, VB, or VIB of the Periodic Table and a polar or non-polar organic solvent.

3. The fuel according to claim 1 or the fuel additive according to claim 2 wherein the metal is a transition metal.

4. The fuel or fuel additive according to claim 3 wherein the metal is rhodium, copper, silver, gold, palladium, platinum, iron, manganese, chromium, cobalt or vanadium.

5. The fuel according to claim 1 or the fuel additive according to claim 2 wherein the metal is terbium, praeseodymium, samarium, gadolinium, antimony, selenium, gallium, magnesium, beryllium, boron or calcium.

6. The fuel according to claim 1 or the fuel additive according to claim 2 wherein the oxide has the formula:

$Ce_{1-x}M_xO_2$ where M is said metal or metalloid and x has a value up to 0.3.

7. The fuel according to claim 1 or the fuel additive according to claim 2 wherein the oxide has the formula:

$[(CeO_2)_{1-n}(REO_y)_n]_{1-k}M'_k$ where M' is said metal or metalloid other than a rare earth, RE is a rare earth, y is 1 or 1.5 and each of n and k, which may be the same or different, has a value up to 0.5.

8. The fuel according to claim 1 or the fuel additive according to claim 2 wherein the particles have a size not exceeding 1 micron.

9. The fuel or fuel additive according to claim 8 wherein the particles have a size from 1 to 300 nm.

10. The fuel or fuel additive according to claim 1 or the fuel additive according to claim 2 wherein the cerium oxide has been doped with more than one said metal or metalloid and/or oxide thereof.

11. The fuel or fuel additive according to claim 1 or the fuel additive according to claim 2 wherein the particles have been coated with an organic acid, anhydride or ester or a Lewis base.

12. The fuel or fuel additive according to claim 11 in which the coating agent is oleic acid or dodecylsuccinic anhydride.

13. The fuel according to claim 1 which is diesel fuel.

14. The fuel according to claim 1 which also comprises an organo platinum group compound.

15. The fuel additive according to claim 2 wherein the solvent is an aliphatic or aromatic hydrocarbon or an aliphatic alcohol.

16. The fuel additive according to claim 2 which comprises one or more of a detergent, dehazer, anti-foaming agent, ignition improver, anti-rust agent, reodorant, antioxidant, metal deactivator or lubricity agent.

17. A method for making an additive-containing fuel comprising incorporating into a fuel particles of cerium oxide which have been doped with a divalent or trivalent metal or metalloid which is a rare earth metal, a transition metal or a metal of group IIA, IIIB, VB, or VIB of the Periodic Table.

18. A method of improving the combustion of a fuel which comprises incorporating therein particles of cerium oxide which have been doped with a divalent or trivalent metal or metalloid which is a rare earth metal, a transition metal or a metal of group IIA, IJIB, VB, or VIB of the Periodic Table.

19. A fuel which comprises the fuel additive as claimed in claim 2.

* * * * *

UNITED STATES PATENT AND TRADEMARK OFFICE
CERTIFICATE OF CORRECTION

PATENT NO. : 7,169,196 B2 Page 1 of 1
APPLICATION NO. : 10/494815
DATED : January 30, 2007
INVENTOR(S) : Gareth Wakefield It is certified that error appears in the above-identified patent and that said Letters Patent is hereby corrected as shown below:

Column 8: Claim 18, line 40, replace "IJIB" with -- IIIB --.

Signed and Sealed this

Twenty-seventh Day of November, 2007

JON W. DUDAS
*Director of the United States Patent and Trademark Office*